Dec. 7, 1954 W. E. VAN OS 2,696,299
CONTINUOUS PROCESS FOR THE SEPARATION OF MIXTURES
OF SOLID PARTICLES INTO TWO FRACTIONS
Filed Sept. 15, 1950 3 Sheets-Sheet 3

INVENTOR
Willem E. Van Os
By Cushman, Darby & Cushman
ATTORNEYS

United States Patent Office 2,696,299
Patented Dec. 7, 1954

2,696,299

CONTINUOUS PROCESS FOR THE SEPARATION OF MIXTURES OF SOLID PARTICLES INTO TWO FRACTIONS

Willem E. van Os, Heerlen, Netherlands, assignor to Stamicarbon N. V., Heerlen, Netherlands Application September 15, 1950, Serial No. 185,062

Claims priority, application Netherlands September 20, 1949

4 Claims. (Cl. 209—172.5)

This invention relates to a continuous process for the separation of mixtures of solid particles into two fractions, one of which substantially consists of particles having a specific gravity exceeding a predetermined specific gravity of separation, the other fraction substantially consisting of particles having a lower specific gravity.

More particularly this invention relates to a process wherein the separation is effected by means of a separating suspension. Many such processes are known in the art of washing coal and ore.

Depending upon circumstances many kinds of suspensions are used. Whereas the liquid carrier medium usually is water, the suspensoid may be loess, shale, baryte, clay, magnetite, ferro-silicon, galena and many more, and a mixture of two or more of these suspensoids may also be used.

The function of the suspension is to create a bath or a barrier which can not be passed by the lighter one of the constituents of the mixture to be separated. Therefore the suspension particles should have a specific gravity above the specific gravity of separation. After this separation has been effected the separated fractions have to be cleaned of adhering suspensions.

It is well-known in the art that the size of the suspension particles must be significantly smaller than the size of the particles to be separated.

In the separation of large sized particles it is therefore possible to screen the separated fractions and thus recover the suspension. When, however, small particles must be separated, for instance particles with a diameter smaller than 1 or 2 mm., screening is impracticable.

In that case it is advantageously to use a suspensoid which can be recovered on account of other properties than the size of its particles.

This is one of the reasons why use is made of magnetic particles, such as magnetite. A mixture of fine particles and magnetite easily can be separated by treating it in a magnetic separator, i. e. an apparatus, wherein magnetics and non-magnetics are separated. Treatment in a magnetic separator, however, also has the result that magnetic particles are brought in a magnetic condition.

In a suspension of magnetic particles which are in a magnetic condition these magnetic particles flocculate and settle easily. This is an advantage when such suspension must be thickened, but the flocs usually will be too large to be useful in a separating suspension.

The common practice when using a magnetite suspension therefore is to demagnetise these particles before feeding them into the specific gravity separator, magnetising them again after their discharge from the specific gravity separator, whereupon the magnetic suspension particles are recovered from the separated fractions in a magnetic separator.

Generally part of the suspension must be thickened and on account of the magnetic condition of the suspension particles they flocculate in the thickener, the flocs settling easily, so that suspension losses are kept relatively low for such fine material. These losses also must be low, because magnetite is very expensive. Particles which are not in a magnetic condition will overflow in a thickener on account of their fineness and thus will be lost.

It will be clear that the process broadly described above is a very delicate one. On the one hand all suspension particles, entering a thickener, must be in a magnetic condition, whereas on the other hand none of the particles entering the specific gravity separator may be in a magnetic condition. Therefore high demands are made both on the magnetization and on the demagnetization installation. The suspension particles must be magnetized and demagnetized every round they make in the circuit. It will be clear that undesirable losses of suspension material can not be prevented and that also the effect of the specific gravity separator is reduced by the presence of particles which are in a magnetic condition.

It is the object of the invention to simplify this procedure by providing a process in which the specific gravity separation is effected by means of a suspension of particles which are in a magnetic condition.

Another object of the invention is to obviate the use of demagnetizers in the process.

It is in particular the object of the invention to provide a simple method wherein the separated fractions are substantially not contaminated and wherein the losses of suspension particles are extremely low.

To attain these objects special measures must be taken to prevent flocculation of the suspension particles in the specific gravity separator.

This can be accomplished by establishing shearing forces in the specific gravity separator. Shearing forces prevent formation of flocs and destroy flocs present already.

To establish shearing forces in a specific gravity separator the suspension is fed under pressure into a confined circular space of substantially conical form, at the widest end thereof. The separated fraction containing the specially heavy particles in suspension are withdrawn through a circular aperture at the apex of said space and the specifically lighter particles and suspension are withdrawn through an axial tube protruding into the wide end of said space. Thus spiralizing films of suspension are established, each inner film travelling at a greater rotational velocity than its adjacent outer film, so that shearing forces are established at all places in said space. In this manner flocculation of suspension particles with magnetic properties is prevented.

Such specific gravity separators are called hydrocyclone separators. In hydrocyclone separators very sharp separations can be effected. The suspension particles may consist of magnetic magnetite, ferrosilicon or other material which is in a magnetic condition. The specific gravity of these particles should be higher than the specific gravity of separation and their size must be substantially smaller than the size of the particles to be separated.

The best embodiment of the invention now known to me will be described hereinafter for illustrative purposes but it is to be understood that it is illustrative only and not limiting because obviously certain changes and modifications are possible as long as they fall in the metes and bounds as defined by the appended claims or the equivalents of the latter's requirements.

The embodiment has been illustrated in the accompanying drawings wherein.

Figure 1:
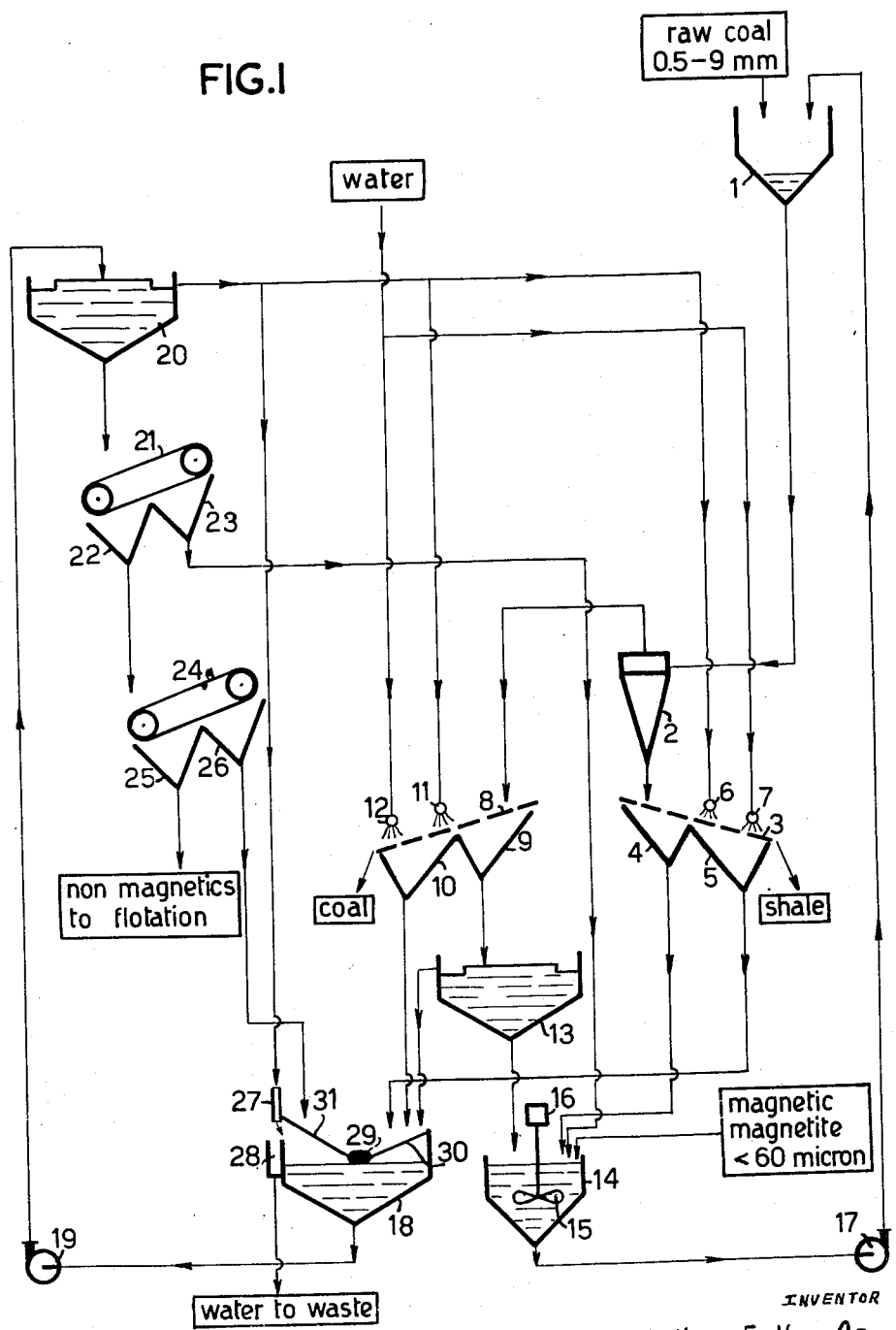
Figure 1 is a flowsheet of a coal washing plant showing the embodiment of the invention schematically.

In Figure 1, 1 is a bunker vessel, 2 a hydrocyclone, 3 is a screen with receivers 4 and 5 for the throughfall of screens 3, 6 and 7 being sprayheads, 8 is a screen with receivers 9 and 10 for the throughfall of screen 8, 11 and 12 being sprayheads, 13 is a thickener, 14 a mixing vessel with an impeller 15 driven by a motor 16, 17 is a pump, 18 is a receiver, 19 is a pump, 20 is a thickener, 21 is a magnetic separator with receiver 22 for the non magnetics and receiver 23 for the magnetic particles, 24 is a magnetic separator with receiver 25 for the nonmagnetics and receiver 26 for the magnetic particles, 27 is a rubber tube which either discharges to duct 28 or to receiver 18, 29 is a float which by means of bars 30 and 31 governs rubber tube 27.

Figure 2:
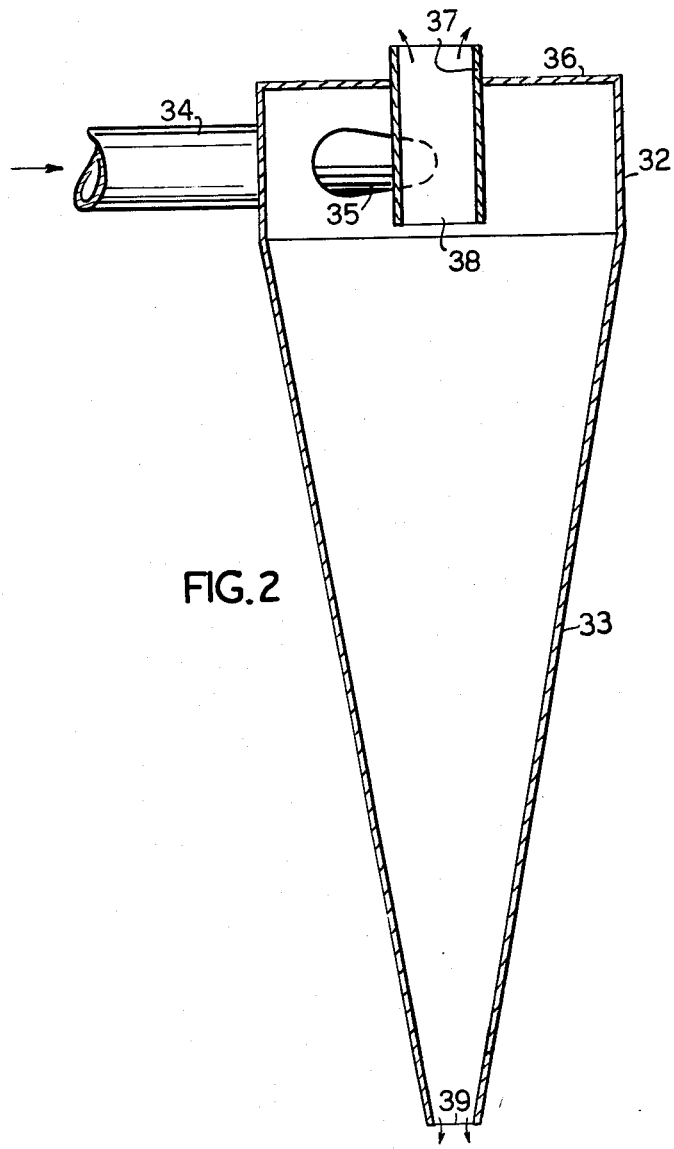
Figure 2 is a schematical cross-section of the hydrocyclone 2 in Figure 1.
Figure 3:
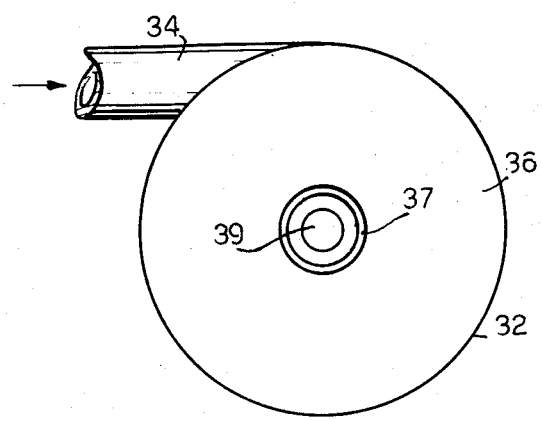
Figure 3 is a plan view of the hydrocyclone of Figure 2.

The screens have apertures which are 0.5 mm. broad and 20 mm. long. Figures 2 and 3 show that hydrocyclone 2 comprises a cylindrical part 32 having a diameter of 350 mm. and a height of 140 mm., and a conical part 33 with an apex angle of 20°, a feed tube 34 leading tangentially into cylindrical part 32 through aperture 35. At aperture 35 tube 34 has a diameter of 70 mm. The cylindrical part 32 has a cover 36 and a tube 37, called vortex finder, with aperture 38 which has a diameter of 70 mm. Tube 37 is connected with cover 36 and protrudes 140 mm. into the cylindrical part 32. The conical part 33 has a circular aperture 39 at its apex. This aperture has a diameter of 40 mm.

In a specific operation raw coal of sizes between 0.5 and 9 mm. is fed at a rate of 26 metric ton per hour to bunker vessel 1 together with 100 m.$^3$ per hour suspension of magnetized magnetite in water, the suspension having a specific gravity of 1.41 and the magnetite particles having a large diameter not exceeding 60 microns. The height of vessel 1 above hydrocyclone 2 is that the mixture of raw coal and suspension is fed at a gauge pressure of 1.3 kg. per square centimeter into hydrocyclone 2. This mixture, being introduced tangentially into the cylindrical part 32 of the hydrocyclone gets into a quick rotation in the cylindrical part 32 and in the conical part 33, establishing two vortices, an outer one which carries mixture from the feed aperture 35 in the direction of apex 39 and an inner vortex carrying mixture in the opposite direction. Along the axis of the hydrocyclone there is an air column.

Figure 4:
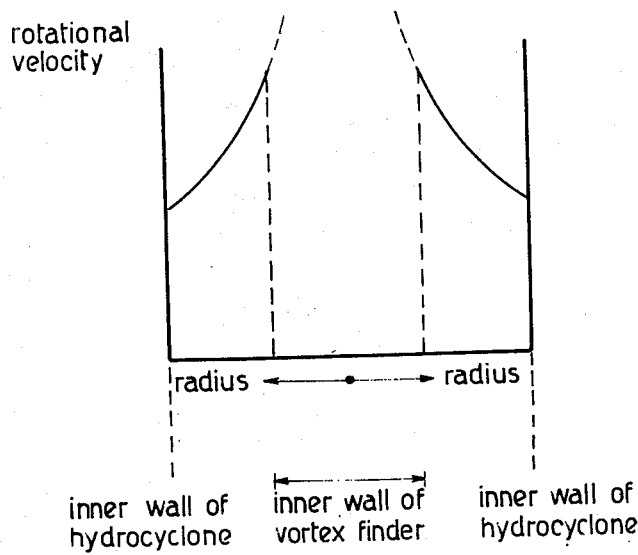
Figure 4 is a schematical graph showing the relation between the rotational velocity of suspension in a hydrocyclone in dependence upon the distance between the place where said rotational velocity occurs and the axis of the hydrocyclone.

The rotational velocity of the mixture is higher near the axis than at the periphery of the hydrocyclone. This feature is shown schematically in Figure 4. The mixture therefore does not rotate in the hydrocyclone like a solid body, but one should imagine spiralizing films, each inner film travelling at a greater rotational velocity than its adjacent outer film. Thus shearing forces, present at all places in the hydrocyclone, prevent flocculation of the magnetized magnetite, which therefore remains completely dispersed in the mixture.

Due to the thickening effect a hydrocyclone has, the magnetized magnetite in the hydrocyclone is thickened somewhat near its apex. Thus near the apex of the hydrocyclone the specific gravity of the suspension will be higher than 1.41, and amounts to approximately 1.59. The coal particles can not pass through this concentrated suspension acting like a barrier and therefore are discharged through aperture 38. The shale particles in the mixture are not discharged through aperture 38 because these specifically heavy particles are centrifuged out of the inner vortex. These particles, however, can pass the barrier of concentrated suspensions and thus are discharged through the apex aperture 39. To obtain this effect the magnetized magnetite particle must have a largest diameter not exceeding 60 microns.

The discharged fraction from the apex 39 of hydrocyclone 2 is received on screen 3. The suspension passing the first part of screen 3 is received in receiver 4, from where the suspension is led to mixing tank 14. Over the second part of screen 3 are sprayheads 6 and 7 for the cleaning of the shale. The cleaned shale amounts to 6.8 tons per hour having the following composition:

| grain size, mm | 0.5-1 | 1-2 | 2-4 | 4-9 | 0.5-9 |
|---|---|---|---|---|---|
| weight, tons/h | 0.06 | 1.12 | 2.38 | 3.24 | 6.8 |
| specific gravity: | | | | | |
| <1.3__percent of total fraction__ | 0.57 | 0.10 | 0.03 | 0.01 | 0.04 |
| 1.3-1.4_____do____ | 0.75 | 0.17 | 0.12 | 0.04 | 0.10 |
| 1.4-1.5_____do____ | 0.57 | 0.19 | 0.21 | 0.20 | 0.12 |
| 1.5-1.6_____do____ | 0.75 | 1.17 | 2.19 | 2.66 | 2.23 |
| 1.6-1.7_____do____ | 1.70 | 2.99 | 3.06 | 3.33 | 3.16 |
| 1.7-1.8_____do____ | 2.83 | 3.34 | 3.17 | 3.24 | 3.22 |
| 1.8-1.9_____do____ | 2.08 | 3.04 | 3.49 | 3.61 | 3.46 |
| 1.9-2.0_____do____ | 2.26 | 3.88 | 3.09 | 3.22 | 3.27 |
| >2.0_____do____ | 88.5 | 85.1 | 84.6 | 83.7 | 84.4 |
| ash content | | | | | 78.9 |

The throughput of the second part of the screen 3 is received in receivers from where it is led to receiver 18.

The discharged fraction from the vortex finder 37 of hydrocyclone 2 is received on screen 8. The suspension passing the first part of screen 8 is received in receiver 9, from where the suspension is led to thickener 13, as the specific gravity of this suspension is lower than 1.41 due to the water in the raw coal. Over the second part of screen 8 are sprayheads 11 and 12 for the cleaning of the coal. The cleaned coal amounts to 17.8 tons per hour having the following composition:

| grain size, mm | 0.5-1 | 1-2 | 2-4 | 4-9 | 0.5-9 |
|---|---|---|---|---|---|
| weight, tons p./h | 0.40 | 3.76 | 5.92 | 7.72 | 17.8 |
| specific gravity: | | | | | |
| <1.3__percent of total fraction__ | 58.0 | 68.7 | 69.8 | 70.5 | 69.7 |
| 1.3-1.4_____do____ | 35.5 | 25.9 | 25.4 | 25.1 | 25.5 |
| 1.4-1.5_____do____ | 3.34 | 3.55 | 3.57 | 3.47 | 3.52 |
| 1.5-1.6_____do____ | 1.74 | 1.36 | 1.08 | 0.92 | 1.09 |
| 1.6-1.7_____do____ | 0.80 | 0.24 | 0.05 | 0.00 | 0.09 |
| 1.7-1.8_____do____ | 0.13 | 0.06 | 0.02 | 0.02 | 0.03 |
| 1.8-1.9_____do____ | 0.13 | 0.03 | 0.01 | 0.00 | 0.01 |
| 1.9-2.0_____do____ | 0.13 | 0.03 | 0.01 | 0.00 | 0.01 |
| >2.0_____do____ | 0.27 | 0.08 | 0.05 | 0.00 | 0.04 |
| ash content | | | | | 3.0 |

The throughput of the second part of screen 8 is received in receiver 10 from where it is led to receiver 18.

Thickener 13 is of the settling type. No shearing forces are acting in such a thickener. Therefore the magnetized magnetite particles, which as a matter of fact are small magnets, attract each other and thus flocculate. The relatively large magnetite flocs easily settle in the thickener and its overflow contains but a small amount of magnetite. If the magnetite would not be in a magnetic condition a large part thereof would find its way into the overflow.

A thickener of the hydrocyclone type can not be used instead of thickener 13 which is of the settling type. In a hydrocyclone thickener flocculation of the magnetized magnetite particles would be prevented so that a large part of the magnetite would occur in the diluted fraction.

The overflow of thickener 13 is led to receiver 18, whereas the thickened product from thickener 13 is led to mixing tank 14.

From receiver 18 the dilute suspension and degradated coal and shale therein are pumped by pump 19 to thickener 20 at a rate of approximately 165 m.$^3$ per hour.

Thickener 20 is of the settling type, so that the small amount of magnetite in the feed of this thickener 20 can flocculate and settle. Practically no magnetite appears in the overflow of thickener 20. During their passage through hydrocyclone 2 and over screens 3 and 8 some shale and coal particles are broken so that they pass through the screens 3 and 8 which have 0.5 mm. apertures. This so-called degradated shale and coal finds its way to thickener 20 where most of it settles together with magnetite.

The thickened fraction from thickener 20, amounting to approximately 20m.$^2$ per hour therefore is led to magnetic separator 21. The magnetics collected thereby in receiver 23 are led to mixing tank 14 whereas the non-magnetic fraction from magnetic separator 21 is collected in receiver 22 from where it is led to the second magnetic separator 24. The magnetics collected by magnetic separator 24 are discharged in receiver 26 and led back to receiver 18. These magnetic particles are thus recirculated in the circuit of the magnetic separators 21 and 24. The non-magnetics from magnetic separator 24 amounting to approximately 6m.$^3$ per hour are collected in receiver 25. This fraction contains the coal and shale amounting to approximately 1.1 tons per hour degradated during the process.

By treating this fraction in a froth flotation machine the coal can be recovered therefrom.

Due to the fact that the magnetite in the thickened fraction of thickener 20 is in a magnetic condition, substantially all of the magnetite is caught by the magnetic separators so that practically no magnetite is lost in the fraction of non-magnetics.

Fresh water is introduced in the circuit through the spray-heads 3 and 12 above the screens 3 and 8.

The overflow of thickener 20, amounting to approximately 145m.$^3$ per hour partly is led to sprayheads 6 and 11 above the screens 3 and 8 and the balance goes to rubber tube 27 from where it is led either to receiver 18 or to duct 28 and then to waste, depending on the liquid level in receiver 18. When the level in receiver 18 is high rubber tube 27 discharges into duct 28, whereas when the level is low the rubber tube is pulled away from duct 28 to discharge in receiver 18 by the action of float 29 and bars 30 and 31. On the average 8m.$^3$ per hour of water containing approximately 0.3 ton of solids goes to waste along duct 28.

In that way the volume of liquid in the circuit is kept substantially constant and an accumulation of fine coal, shale and clay particles in the circuit is prevented.

The magnetite losses are made up by supplying magnetized magnetite to mixing tank 14 from where the suspension is pumped by pump 17 to bunker vessel 1.

The magnetite losses are as follows:

|   | Kg. per hour |
|---|---|
| Adhering to the washed coal and shale | 33.2 |
| In the nonmagnetics fraction from receiver 25 | 15.9 |
| In the water going to waste along duct 28 | 0.6 |

The total magnetic losses thus amount to 49.7 kg. per hour, or less than 2 kg. per ton of raw coal. This is extremely low but when using more spraying water even better figures can be attained.

Thus every hour 49.7 kg. of magnetite is introduced in mixing vessel 14. As a consequence the amount of magnetite in the circuit is constant and as has been explained already also the volume of liquid in the circuit is constant. Thus the specific gravity of the suspension introduced in bunker vessel 1 is constant so that the hydrocyclone 2 operates on a constant feed.

In this example the specific gravity of separation amounts to approximately 1.59. A higher specific gravity can be attained by increasing the amount of magnetite in the circuit, that is to say by temporary increasing the amount of magnetite fed into the circuit.

The preparation of fresh magnetite suspension still presents a problem. It has been mentioned already that the magnetite particles must be smaller than 60 microns. Most magnetite, however, after milling is in a magnetic condition. The preparation of fresh magnetite therefore best can be done by using a hydrocyclone classifier in closed circuit with a ball mill. The shearing action in the hydrocyclone classifier prevents flocculation, so that good classification results can be obtained. Excellent results can be obtained in a hydrocyclone with a diameter of the cylindrical part 32 of 350 mm., a height of the cylindrical section 32 of 140 mm., a conical section 33 with a cone angle of 60°, an infeed entrance 35 of 70 mm., an aperture 38 of 150 mm. and an apex aperture 39 of 80 mm., and operated at a feed pressure of 0.5 kg. per square centimeter gauge pressure.

The magnetite of course must be in a magnetic condition when it is brought into the circuit.

Although the example described above refers to the separation of coal and shale by means of a magnetized magnetite suspension, it will be clear that the same plant can be used to separate coal and shale by means of a ferrosilicon suspension or a suspension of other magnetisable material, whereas the same principles can be used for separating particles having another nature.

I claim:

1. A continuous process for the separation of mixtures of solid particles into two fractions, one of which consists substantially of particles having a specific gravity exceeding a predetermined specific gravity of separation, the other fraction consisting substantially of particles having a lower specific gravity, comprising the steps of feeding the mixture together with a separating suspension consisting of solid, magnetized suspension particles of a specific gravity higher than the specific gravity of separation and liquid, under pressure tangentially into a confined circular space of substantially conical form at the widest end thereof, the separated fraction containing the specifically heavy particles and suspension being withdrawn through a circular aperture at the apex of said space, the specifically light particles and suspension being withdrawn through an axial tube protruding into the wide end of said space, whereby spiralizing films of suspension are established and maintained, each inner film traveling at a greater rotational velocity then its adjacent outer film so that shearing forces are exerted at all places in said space, which shearing forces prevent flocculation in said space of the magnetized suspension particles, recovering the suspension particles from the separated fractions by magnetic separation, and returning the separated suspension particles to said confined space without intermediate demagnetization.

2. A continuous process for the separation of solid particles into two fractions comprising delivering a mixture of the particles and a suspension of magnetized particles, said suspension particles having a specific gravity higher than the specific gravity of separation, tangentially and under pressure to a cyclone separator, withdrawing heavy particles and suspension particles from the apex of said cyclone and withdrawing light particles and suspension particles from said cyclone at a point distant from said apex, removing suspension particles from the separated fractions by magnetic separation, and returning the suspension particles to said cyclone without intermediate demagnetization.

3. A continuous process for the separation of solid particles into two fractions comprising delivering a mixture of the particles and a suspension of magnetized particles, said suspension particles having a specific gravity higher than the specific gravity of separation, tangentially and under pressure to a cyclone separator, withdrawing heavy particles and suspension particles from the apex of said cyclone and withdrawing light particles and suspension particles from said cyclone at a point opposite said apex, removing suspension particles from the separated fractions by thickening and magnetic separation, and returning the suspension particles to said cyclone without intermediate demagnetization.

4. A continuous process for the separation of solid particles into two fractions comprising delivering a mixture of the particles and a suspension of magnetized particles, said suspension particles having a specific gravity higher than the specific gravity of separation, tangentially and under pressure into the wide end portion of a cyclone separator, withdrawing heavy particles and suspension particles from the apex of said cyclone and withdrawing light particles and suspension particles through an axial tube extending into the wide end of said cyclone, removing the suspension particles from the separated fractions by thickening and magnetic separation, and returning the suspension particles to said cyclone without intermediate demagnetization.

References Cited in the file of this patent

UNITED STATES PATENTS

| Number | Name | Date |
|---|---|---|
| 2,373,635 | Wuensch | Apr. 10, 1945 |
| 2,543,689 | Driessen et al. | Feb. 27, 1951 |
| 2,633,987 | Bean | Apr. 7, 1953 |

OTHER REFERENCES

Quarterly of the Colorado School of Mines, January 1948, vol. 43, No. 1, pp. 36 to 42.